United States Patent
Hormann

(10) Patent No.: US 7,980,151 B2
(45) Date of Patent: Jul. 19, 2011

(54) DOOR DRIVE

(75) Inventor: Michael Hormann, Halle/Westf. (DE)

(73) Assignee: Marantec Antriebs-und Streuerungstechnik GmbH & Co. KG, Marienfeld (DE)

(*) Notice: Subject to any disclaimer, the term of this patent is extended or adjusted under 35 U.S.C. 154(b) by 1239 days.

(21) Appl. No.: 11/645,902

(22) Filed: Dec. 26, 2006

(65) Prior Publication Data

US 2007/0193384 A1    Aug. 23, 2007

(30) Foreign Application Priority Data

Dec. 28, 2005  (DE) ............... 20 2005 020 342 U
Jun. 30, 2006  (DE) ............... 20 2006 010 188 U

(51) Int. Cl.
*E05F 15/10*    (2006.01)

(52) U.S. Cl. ......... 74/421 A; 74/411; 74/606 R; 49/335; 49/358

(58) Field of Classification Search ........... 74/421 A, 74/625, 606 R, 411; 49/334–337, 340–342, 49/349, 358
See application file for complete search history.

(56) References Cited

U.S. PATENT DOCUMENTS

| 3,874,117 | A | * | 4/1975 | Boehm | 49/264 |
| 4,472,910 | A | | 9/1984 | Iha | |
| 4,895,048 | A | * | 1/1990 | Key et al. | 74/625 |
| 5,035,549 | A | * | 7/1991 | Asano et al. | 408/132 |
| 5,083,600 | A | * | 1/1992 | Weishar et al. | 160/310 |
| 5,755,059 | A | * | 5/1998 | Schap | 49/360 |
| 7,370,549 | B2 | * | 5/2008 | Haga et al. | 74/416 |

FOREIGN PATENT DOCUMENTS

| AT | 407068 | 4/2000 |
| DE | 3331211 | 3/1984 |
| DE | 29809641 | 11/1998 |

* cited by examiner

*Primary Examiner* — William C Joyce
*(74) Attorney, Agent, or Firm* — Dilworth & Barrese, LLP

(57) ABSTRACT

A door drive for garage, garden, hall or factory doors, comprising a motor unit which comprises a drive motor and a motor output shaft, an output transmission, which on the input end can be connected with the motor output shaft and on the output end includes a transmission output shaft for driving a door moving element, in particular a door shaft, a release clutch for releasing the motor output shaft with respect to the door moving element as well as at least one damping element for damping drive shocks. The door drive is characterized in that the output transmission includes a transmission housing formed separate from the motor unit and together with the release clutch and the damping element forms a separate, modular drive attachment, which can be connected on the one hand to the motor unit and on the other hand to the door moving element.

20 Claims, 2 Drawing Sheets

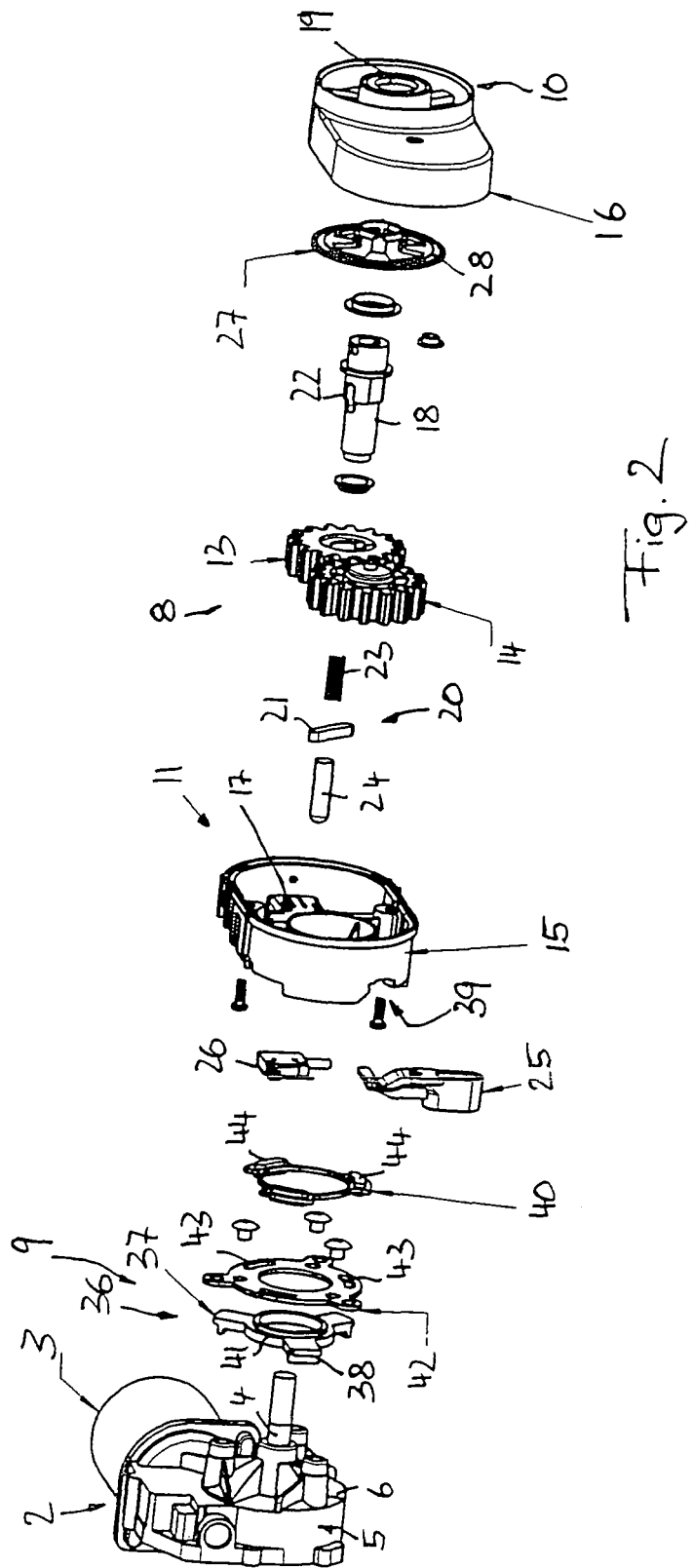

DOOR DRIVE

BACKGROUND OF THE INVENTION

The present invention relates to a door drive for garage, garden, hall or factory doors, comprising a motor unit which comprises a drive motor and a motor output shaft, an output transmission, which on the input end can be connected with the motor output shaft and on the output end includes a transmission output shaft for driving a door moving element, in particular a door shaft, a release clutch for releasing the motor output shaft with respect to the door moving element as well as a damping element for damping drive shocks.

For driving doors such as garage doors, garden doors, hall doors or also large factory doors, there are regularly used electric motors which drive a door moving element, mostly a door shaft, via an output transmission, in order to wind up for instance a door cable or a door chain to which the door is attached. It is appreciated that other door moving elements can be used as well. To be more precise, there are actually provided two transmissions between the actual drive motor and the door moving element. First of all, the regularly very high speed of the electric motor is reduced for instance via a worm gear stage to the speed of the motor output shaft. However, this first gear stage forms part of the motor unit, so to speak, and often forms part of the purchased electric motor or the motor unit. In order to adapt the speed of the motor output shaft to the requirements of the door drive, there is also used a further gear stage, which is seated on the motor output shaft and together with the transmission output shaft drives the door moving element.

For this output transmission, a transmission housing usually is provided on the motor unit, in which the transmission elements, mostly a spur gear stage, are disposed and on which the transmission output shaft is supported.

Dimensional tolerances of many individual parts, however, often lead to inaccuracies inside the transmission. Damping and release additionally are provided at various points, so that generally long tolerance chains are obtained. In addition, the motor unit must separately be adjusted for the respective application.

SUMMARY OF THE INVENTION

Proceeding therefrom, it is the object underlying the present invention to create an improved door drive as mentioned above, which eliminates the disadvantages of the prior art and develops the latter in an advantageous way. In particular, an adaptation of the drive motor to the door to be driven should be provided with simple means and long tolerance chains inside the output transmission should thereby be avoided.

In accordance with the present invention, this object is solved by a door drive as described herein. Preferred aspects of the invention are subject-matter of the description herein.

Thus, it is proposed to no longer integrate the output transmission in the motor unit or the housing of the motor unit. In accordance with the present invention it is rather provided that the output transmission has a transmission housing formed separate from the motor unit and together with the release clutch and the damping element forms an independent, modular drive attachment which on the one hand can be connected to the motor unit and the motor output shaft thereof and on the other hand to the door moving element. For the door drive, a modular structure is proposed. The separate drive attachment thus can close the gap in the drive train between the drive motor and the door moving element. On the one hand, the motor unit appropriate for the respective door can be attached to or mounted on the drive attachment, for which purpose the drive attachment includes connecting means adapted to the respective motor unit. On the other hand, the drive attachment includes connecting means adaptable to the respective door moving element, so as to be connectable to the respective door moving element. By forming the output transmission as a separate drive attachment, a long tolerance chain is avoided. In addition, integrating the release clutch and the damping element in this drive attachment thus can provide a complete package which meets the necessary requirements for a door drive, such as release and, damping of drive shocks, independent of the design of the motor unit.

In accordance with a development of the invention, further functional components of the door drive can be integrated in the separate drive attachment. In accordance with a development of the invention, a travel sensing means, preferably a pulse disk, for detecting the door position is integrated in the drive attachment, in particular accommodated inside the transmission housing. The travel sensing means advantageously is disposed on the output end of the release clutch, and when the travel sensing means is formed with a pulse disk, the latter can directly be seated on the transmission output shaft. Advantageously, the associated pulse reader likewise is disposed inside the transmission housing.

Alternatively or in addition, a release detection means for detecting the release position of the release clutch can also be integrated in the separate drive attachment, so that the function of monitoring the release is also realized by the drive attachment. The release detection means can include a limit switch which detects the release position of the release clutch and in addition can effect a shutdown of the energy supply of the motor unit when the release of the release clutch is detected. The limit switch can be attached to the transmission housing and monitor the actuation of a release lever which actuates the release clutch and likewise can be mounted on the transmission housing.

To be able to connect the appropriate drive motor in a suitable orientation, various and/or variable connecting means for the motor unit are provided on the motor connection end of the drive attachment in accordance with a development of the invention, so that various motor units and/or the same motor unit in various orientations can be attached to the drive attachment relative to the same. The connecting means can comprise, for instance, a plurality of sets of bores, through which the drive attachment can be screwed to the respective motor unit. In particular, the connecting means are provided on the transmission housing, in order to screw the same to the motor unit.

Alternatively or in addition, the drive attachment can also include on its output end various and/or variable connecting means for connecting various door moving elements and/or the same door moving element in various orientations.

Particularly advantageously, the motor-end connecting means of the drive attachment can comprise a quick locking device for quickly locking the drive attachment with respect to the motor unit. According to one embodiment of the invention, the quick locking device can be designed so as to be actuatable without any tool. In particular, a bayonet lock can be provided between the motor unit and the drive attachment, by means of which the drive attachment can be attached to the motor unit particularly quickly. The quick locking device is characterized in that motor-end engagement means and engagement means adapted thereto, which are provided on the drive attachment, can be brought in a positive locking engagement by combining an axial movement and a rotary movement. According to an advantageous embodiment of the invention, there can be provided engagement claws rotatably mounted about the motor output shaft or about an axis of rotation parallel thereto, which can be brought in engagement with engagement recesses formed complementary thereto.

In principle, the transmission housing can have various designs. According to a preferred embodiment of the invention, it consists of two shells which can be placed on top of each other and one of which includes the connecting means for connecting the motor unit and the other one includes bearing means for supporting the transmission housing with respect to the driving forces or torques.

Advantageously, various gear stages can be inserted in the transmission housing of the drive attachment, in order to realize various step-up or step-down ratios between the motor output shaft and the transmission output shaft. By means of such a replaceable gear stage, the speed provided by the motor output shaft can be adapted to the requirements of the respective door, without a completely different drive attachment having to be provided each time.

In particular, the replaceable gear stage can include a pair of spur gears, which comprises a smaller and a larger spur gear. To this end, the step-up or step-down ratio provided by the gear stage can simply be changed in that the two spur gears are exchanged for each other, which is possible with the axial distance remaining the same. Alternatively or in addition, other pairs of spur gears can also be inserted in the transmission housing, in order to achieve completely different or further variations of the step-up or step-down ratio.

In principle, the gear stage can be mounted in the transmission housing in various ways. According to an advantageous embodiment of the invention, all transmission gear wheels of the gear stage are supported on the same transmission housing shell. Thereby, a precise mounting can be achieved, which is not influenced by connection tolerances of various housing parts.

The damping element for absorbing drive shocks can be integrated in the drive attachment in various ways. According to a preferred embodiment of the invention, the damping element is disposed on a damping element carrier, which is releasably connected with the transmission housing, preferably attached to the outside of the transmission housing. The damping element carrier preferably can consist of a damping sheet, which on the end face is releasably attached, in particular screwed to the transmission housing in the vicinity of the exit of the transmission output shaft, and includes a damping element seat radially spaced from the transmission output shaft. The damping element can for instance be pivotally mounted on a door frame or another component supported with respect to the door moving element, so that drive shocks induced by the driving forces or torques can be absorbed. Advantageously, the damping sheet is screwed to the transmission housing on several points around the exit of the transmission output shaft, so that the drive shocks are absorbed centrally. Preferably, the damping element carrier and/or the transmission housing includes several and/or variable connecting means, in order to provide for connection of the damping element carrier to the transmission housing in different positions. The damping element carrier can in particular be screwed to the transmission housing in various positions, for instance rotated by a specified angular offset, in order to provide for attachment in the most favorable way.

Alternatively or in addition to such damping element, a damping element can also be provided between the drive attachment and the motor unit, wherein this damping element advantageously includes damping means acting radially with respect to the motor output shaft and/or in peripheral direction around the motor output shaft. According to an advantageous embodiment of the invention, the damping element can form an annular damping disk, which is seated between the motor unit and the drive attachment mounted thereon and preferably is in positive engagement with said two components. The annular damping disk can have axial and/or radial engagement protrusions and/or recesses, by means of which it is in positive engagement with the motor unit and the drive attachment or with interposed components each connected therewith.

In particular, the damping element can be formed and/or arranged such that it can be fixed between the drive attachment and the motor unit by the aforementioned quick locking device. The damping element is integrated, so to speak, in the quick locking device.

To achieve a small-size arrangement, at least the locking and unlocking elements of the release clutch are disposed inside the transmission housing. In particular, the release clutch can be disposed between the transmission output shaft and one of the transmission gear wheels of the gear stage, which is seated on said transmission output shaft or connected therewith. The release clutch can include an actuating pin at least partly movably received in the transmission output shaft, which can be actuated by an actuator disposed on the outside of the transmission housing. Said actuating pin can actuate a feather key which is axially movably mounted on the transmission output shaft and depending on the axial position locks or releases the transmission gear wheel seated on the transmission output shaft with respect to the same.

In accordance with a development of the invention, the gear stage provided in the drive attachment is not the only gear stage of the entire door drive. In particular, the motor unit itself can also include the commonly used gear stage for reducing the speed of the electric motor to the speed of the motor output shaft. For instance, between the electric motor shaft and the motor output shaft a worm gear stage or also a straight bevel gear stage can be interposed, which, however, forms an integral part of the motor unit and is accommodated inside the motor housing.

BRIEF DESCRIPTION OF THE DRAWINGS

The invention will subsequently be explained in detail with reference to preferred embodiments and associated drawings, in which:

FIG. 2: shows a perspective exploded view of a door drive with a drive attachment according to another preferred embodiment of the invention.

DESCRIPTION OF THE PREFERRED EMBODIMENTS

Figure 1:
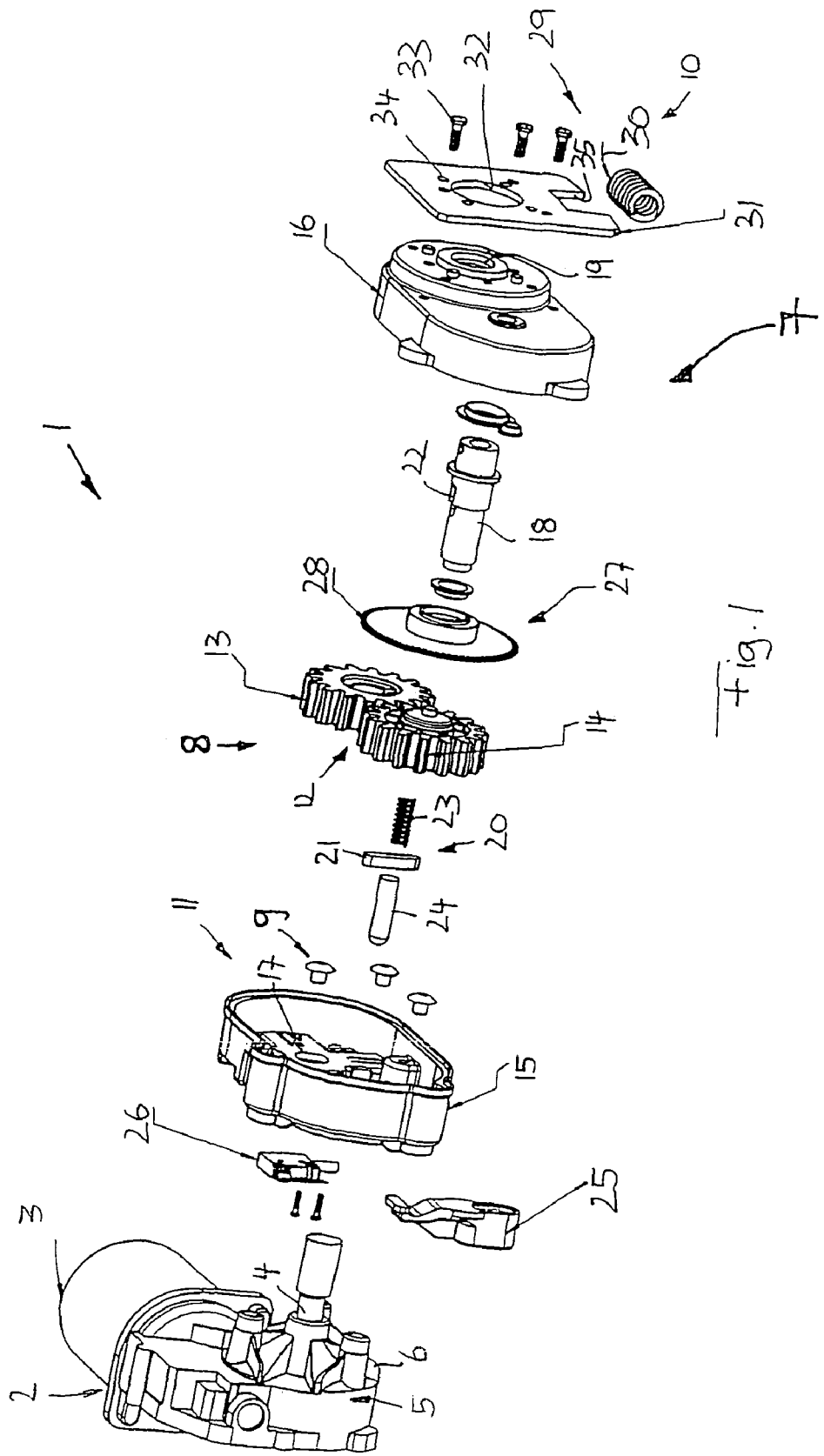
FIG. 1: shows a perspective exploded view of a door drive with a drive attachment according to a preferred embodiment of the invention.

The door drive 1 shown in FIG. 1 comprises a motor unit 2 with an electric motor 3 as well as a motor output shaft 4, which in the illustrated embodiment extends transverse to the longitudinal axis of the electric motor 3. As an electric motor 3, different types of motor can be used. The motor output shaft 4 advantageously is coupled to the motor shaft of the electric motor 3 via a transmission 5, in order to convert the usually rather high speed of the electric motor 3 into a relatively lower speed of the motor output shaft 4. The transmission 5 is accommodated in the housing 6 of the motor unit 2 and in principle can have various designs. In particular, a worm-gear transmission or a straight-bevel-gear transmission can be provided, in order to realize the speed reduction in the desired way. Said transmission 5 is part of the motor unit 2.

On the motor output shaft 4 of the motor unit 2 a drive attachment 7 can be mounted, which includes an output transmission 8 and further functional door drive components. By means of this transmission attachment, a required adaptation of the speed of the motor output shaft 4 to the desired speed, for instance of a door shaft, can again be realized, for instance to be able to use the motor unit 2 for various doors. The drive attachment 7 constitutes an independent functional block, which can be interposed, so to speak, between the motor unit 2 and the door moving element to be moved, which is not separately shown in the drawing, and forms the part of the drive train between the motor unit 2 and the door moving element. By means of this drive attachment 7, which forms a complete functional unit, the door drive 1 obtains a modular structure, which allows to assemble the door drive 1 from individual modules and adapt the same to the requirements of the respective use. The drive attachment 7 comprises a motor-end interface, so that it can be connected with various motor units, and on the other hand an output-end interface for connecting the drive attachment 7 with the respective door moving element. Said interfaces comprise suitable connecting means 9 and 10, to provide for a torque-transmitting connection of the drive attachment 7 to the motor unit 2 or the door moving element. In the illustrated embodiment, a screw connection is provided as a motor-end connecting means 9, by means of which the housing 11 of the drive attachment 7 can releasably be attached to the housing 6 of the motor unit 2.

As shown in FIG. 1, the drive attachment 7 comprises an output transmission 8, which in the illustrated embodiment constitutes a spur-gear transmission with two spur gear wheels 13 and 14. The output transmission 8 is disposed in the transmission housing 11 of the drive attachment 7. In the illustrated embodiment, said transmission housing 11 has a two-shell configuration. A lower housing shell 15 can be attached to the motor unit 2 in the way mentioned above and can be closed by an upper housing shell 16.

The lower housing shell 15 comprises suitable bearing means 17 for supporting the transmission elements of the output transmission 8. It is appreciated that the upper housing shell 16 can also have corresponding bearing means for supporting the spur gear wheels 13 and 14.

The spur gear transmission stage 12 as shown in the Figure allows to easily change the step-up or step-down ratio of the output transmission 8, without the axial distance of the spur gear wheels 13 and 14 and hence the corresponding bearing means 17 having to be changed. One can change, for instance, from a step-down ratio to a step-up ratio by replacing a smaller spur gear wheel 13 by a larger spur gear wheel and a larger spur gear wheel 14 by a smaller spur gear wheel.

On the motor end, the output transmission 8 can be connected with the motor output shaft 4. For this purpose, the spur gear wheel 14 can non-rotatably be connected with the motor output shaft 4, when the transmission attachment is mounted on the motor unit 2. On the output end, the spur gear wheel 13 drives a transmission output shaft 18, on which said spur gear wheel 13 is seated and which on the end face protrudes from the upper housing shell 16 or is accessible from the outside through an output recess 19, in order to be coupled to the door moving element.

Between said spur gear wheel 13 and the transmission output shaft 18 a release clutch is provided, by means of which the transmission output shaft 18 can be unlocked with respect to the motor unit 2. In the illustrated embodiment, the coupling element of the release clutch 20 is integrated in the transmission output shaft 18 or the spur gear wheel 13. As shown in the Figure, the release clutch 20 comprises a feather key 21, which is axially movably, but non-rotatably mounted in a feather key recess 22 in the transmission output shaft 18. On the spur gear wheel 13, a feather key recess likewise is provided in the end face of the internal recess, so that depending on the position of the feather key 21 the spur gear wheel 13 is non-rotatably locked with respect to the transmission output shaft 18 or is released with respect to the same and hence rotatable therewith. The feather key 21 is biased into its locking position by a spring means in the form of a compression spring 23. Said compression spring 23 is accommodated in an axial bore inside the transmission output shaft 18. On the opposite side of the compression spring 23, an actuating pin 24 is seated in the same axial bore in the transmission output shaft 18, which protrudes from the end face of the transmission output shaft 18 and also protrudes from the same through an actuating recess in the lower housing shell 15 or can be actuated from the outside of the lower housing shell 15. For actuating the actuating pin 24 and hence the release clutch 20, a release lever 25 is provided, which is mounted on the transmission housing 11, in particular on the lower housing shell 15. The release lever 25 is pivotally and/or movably mounted between a non-engagement-position and an engagement position, and in the last-mentioned engagement position it is in engagement with the actuating pin 24 and urges the same into the transmission output shaft 18, so that the feather key 21 is urged into its non-engagement position.

The lower housing shell 15 advantageously comprises a plurality of bearing means for the release lever 25, so that the same can be mounted on the outside of the lower housing shell 15 in various orientations.

The position of the release lever 25 is monitored by a limit switch 26, which on a suitable point is firmly mounted on the transmission housing 11. When the release lever 25 is moved into its release position, this is detected by the limit switch 26, which can provide a corresponding message to the control means of the door drive, and can in particular interrupt the power supply for the entire door drive 1, in particular the motor unit 2.

Furthermore, a travel sensing means 27 is integrated in the drive attachment 7, which includes a pulse disk 28 that is coupled to the transmission output shaft 18 such that it rotates in a predetermined way corresponding to the rotation of the transmission output shaft 18. In the illustrated embodiment, the pulse disk 28 advantageously is directly non-rotatably seated on the transmission output shaft 18. Since the pulse disk 28 is coupled to the transmission output shaft 18, the travel sensing means 28 always, in particular also when the release clutch 20 is disengaged, knows the position of the transmission output shaft 18 and hence of the door to be driven. The pulse disk 28 cooperates with a pulse reader, which advantageously likewise is accommodated inside the transmission housing 11 of the drive attachment 7. Like the limit switch 26, the travel sensing means 27 is connected with the control means of the door drive 1 in a non-illustrated way.

With its end protruding from the upper housing shell 16, the transmission output shaft 18 has coupling means on its end face for coupling to a door shaft not shown in the Figure. In the vicinity of the exit of the transmission output shaft 18 from the transmission housing 11, a damping means 29 is attached to the transmission housing 11, in order to absorb drive shocks. As shown in the Figure, the damping means 29 comprises a damping element 30 which in principle can have various configurations. In the illustrated embodiment, the damping element 30 is formed by a spring. The damping element 30 is attached to a damping element carrier, which in the illustrated embodiment constitutes a damping sheet 31. In the vicinity of the exit of the transmission output shaft 18, the damping sheet 31 is seated on the upper housing shell 16 and itself includes a recess 32, through which the transmission output shaft 18 can extend. The damping sheet 31 can non-rotatably be attached to the transmission housing 11 by means of a screw connection 33. Advantageously, the bores 34 in the damping sheet 31 and/or in the upper housing shell 16 are formed and/or distributed such that the damping sheet 31 can be attached to the transmission housing 11 in several positions that are rotated with respect to each other.

FIG. 2 shows another advantageous embodiment of a door drive, which in many aspects corresponds to the door drive as shown in FIG. 1 and includes corresponding components, so that for corresponding components the same reference numerals are used as in FIG. 1, and in so far reference is made to the preceding description. The embodiment as shown in FIG. 2 substantially differs in the formation of the connecting means of the drive attachment 7 for attachment to the motor unit 2 as well as in a damping element disposed on the motor end between the drive attachment 7 and the motor unit 2.

In particular, the drive attachment 7 can be attached to the motor unit 2 by a quick-locking device 36, as shown in FIG. 2. The quick-locking device 36 comprises a bayonet lock 37, by means of which the drive attachment 7 can be positively coupled to the motor unit 2 by combining an axial movement substantially parallel to the motor output shaft 4 and a rotary movement around the same. Advantageously, an only rather small rotary movement, for instance about an angle of rotation less than $\pi$, is sufficient.

As shown in FIG. 2, the bayonet lock 37 comprises a rotary locking plate 41 with radially protruding engagement arms or claws 38, said rotary locking plate 41 including a central recess by means of which it can be moved over the motor output shaft 4. Said rotary locking plate 41 can be rotatably mounted on the motor unit 2, in particular the housing 6 of the motor unit 2, namely about an axis of rotation parallel, in particular coaxial to the motor output shaft 4. In the illustrated embodiment, the rotary locking plate 41 can be fixed at the motor unit 2 by a spacer plate 42, which itself can be screwed to the housing 6 of the motor unit 2. The rotary locking plate 41 is rotatable with respect to the spacer plate 42.

On the housing shell 15 of the drive attachment 7, the bayonet lock 37 on the other hand includes engagement recesses 39 not shown in the drawing, which cooperate with the aforementioned engagement claws 38 of the rotary locking plate 41 and are adapted to the shape thereof. For fastening the drive attachment 7, the same merely is mounted on the motor unit 2 in an axial direction parallel to the motor output shaft 4, the engagement claws 38 moving into the engagement recesses 39. Then, locking can be effected merely by a relative rotation of engagement claws 38 and engagement recesses 39.

As is furthermore shown in FIG. 2, the damping element 40 is seated between the motor unit 2 and the drive attachment 7, which in the illustrated embodiment constitutes an annular damping disk through which the motor output shaft 4 extends. In the illustrated embodiment, said damping element 40 concretely is seated between the aforementioned spacer plate 42 firmly connectable with the motor unit 2 and the housing shell 15 of the drive attachment 7. As shown in FIG. 2, damping recesses 43 are formed in the spacer plate 42, which engage in the engagement protrusions 44 on the damping element 40, so that the damping element 40 is positively retained at the spacer plate 42. Said engagement protrusions 44 also extend towards the housing shell 15 of the drive attachment 7, where they engage in likewise formed damping recesses. Via said positive engagement means 44, the damping element 40 both acts radially and in peripheral direction. The damping element 40 is made of a suitable shock-absorbing and/or vibration-absorbing material.

The invention claimed is:

1. A door drive for garage, garden, hall or factory doors, comprising a motor unit (2) which comprises a drive motor (3), a motor output shaft (4), a drive motor housing, an output transmission (8), which on the input end can be connected with the motor output shaft (4) and on the output end includes a transmission output shaft for driving a door shaft, a release clutch (20) for releasing the motor output shaft (4) with respect to the door moving element, and at least one damping element (30) for damping drive shocks, wherein the output transmission (8) includes a transmission housing (11) formed separate from the motor unit (2) and together with the release clutch (20) and the damping element (30) forms a separate, modular drive attachment, which is connected to the drive motor housing and the transmission housing, wherein the drive motor housing and the transmission housing are formed separate from each other, which receive function blocks of the motor unit (2) and drive attachment (7), wherein two separate gear stages are provided, one of which is integrated in the motor unit (2) and the other one integrated in the drive attachment (7), both gear stages (5, 13, 14) preferably being formed different from each other, and wherein the transmission housing (11) of the drive attachment (7) includes two shells (15, 16) which can be placed on top of each other, one of which includes connecting means (9) for connecting the motor unit (2) and the other one includes connecting means (10) for supporting the driving force.

2. The door drive as claimed in claim 1, wherein a pulse disk (28) for detecting the door position is integrated in the drive attachment (7), and accommodated inside the transmission housing (11) of the attachment transmission.

3. The door drive as claimed in claim 1, wherein a limit switch (26) for detecting the release position of the release clutch (20) and/or for switching off the power supply of the door drive, when the door drive is released, is integrated in the drive attachment (7), and attached to the transmission housing (11) of the attachment drive.

4. The door drive as claimed in claim 1, wherein the drive attachment (7) includes various and/or variable connecting means (9) on the motor connection end for connection to various motor units and/or for connection to one motor unit (2) in various positions relative thereto.

5. The door drive as claimed in claim 1, wherein between the motor unit (2) and the drive attachment (7) a locking device is provided for locking the drive attachment (7) with respect to the motor unit (2).

6. The door drive as claimed in claim 5, wherein the quick-locking device (36) includes engagement means (28) provided on the motor unit (2) and engagement means (29) adapted thereto, which are provided on the drive attachment (7) and can be brought into a positive engagement by rotating the same relative to each other.

7. The door drive as claimed in claim 6, wherein the engagement means (28, 29) are rotatable and lockable about an axis of rotation parallel to the motor output shaft (4).

8. The door drive as claimed in claim 5, wherein the quick-locking device (36) includes a bayonet lock (37).

9. The door drive as claimed in claim 1, wherein the drive attachment (7) includes various and/or variable connecting means on its output end for connection to various door moving elements and/or for connection to one door moving element in various orientations with respect to the same.

10. The door drive as claimed in claim 1, wherein the output transmission (8) includes a replaceable gear stage (12) which can be replaced by a gear stage with a different step-up or step-down ratio.

11. The door drive as claimed in claim 10, wherein the gear stage (12) comprises a pair of spur gears (13, 14).

12. The door drive as claimed in claim 11, wherein the pair of spur gears (13, 14) is supported on the transmission housing shell (15) via bearing (17).

13. The door drive as claimed in claim 1, wherein the at least one or a further damping element (40) is provided between the drive attachment (7) and the motor unit (2).

14. The door drive as claimed claim 13, wherein said damping element (40) is attached between the drive attachment (7) and the motor unit (2) by a locking device (36).

15. The door drive as claimed in claim 13, wherein said damping element (40) includes positive connecting means for positive connection with the motor unit (2) and/or with the drive attachment (7).

16. The door drive as claimed in claim 1, wherein said damping element (40) includes damping elements acting radially with respect to the motor output shaft (4) of the motor unit (2) and/or in peripheral direction around the motor output shaft (4).

17. The door drive as claimed in claim 1, wherein said damping element (40) forms an annular damping disk, through which the motor output shaft (4) extends.

18. The door drive as claimed in claim 1, wherein the release clutch (20) is disposed between the transmission output shaft (18) and a transmission gear wheel (13) of the output transmission (8) accommodated in the transmission housing (11).

19. The door drive as claimed in claim 1, wherein the release clutch (20) includes an actuating pin (24) at least partly movably received in the transmission output shaft (18), which is actuated by an actuator (25) disposed on the outside of the transmission housing.

20. The door drive as claimed in claim 1, wherein the motor unit (2) includes a gear stage (5), having a worm-gear transmission or a straight-bevel-gear transmission, which is connected with the motor output shaft (4) by an electric motor.

* * * * *